United States Patent [19]

Remp et al.

[11] Patent Number: 4,610,362
[45] Date of Patent: Sep. 9, 1986

[54] FRAME FOR THE TRANSPORT AND STORAGE OF PIPES

[75] Inventors: Thomas E. Remp, 5555 Del Monte Dr. T-2, Houston, Tex. 77056; Wilfried Dreyfuss, Dorfstr. 52, 3111 Eimke; Kurt Müller, Mühlenweg, both of Fed. Rep. of Germany

[73] Assignees: Wilfried Dreyfuss, Fed. Rep. of Germany; Thomas E. Remp, Houston, Tex.

[21] Appl. No.: 400,096

[22] Filed: Jul. 20, 1982

[51] Int. Cl.⁴ .................................................. A47F 7/00
[52] U.S. Cl. .................................. 211/59.4; 206/443; 211/60.1; 269/128
[58] Field of Search ............... 211/49 S, 49 R, 60 T, 211/60 R, 60 S, 4, 7, 8, 60 A, 189, 59.1, 13, 194, 188, 182, 59.4; 269/126, 129, 128, 43; 206/443, 452; 410/49

[56] References Cited

U.S. PATENT DOCUMENTS

| | | | |
|---|---|---|---|
| 1,624,252 | 4/1927 | Kenerson | 269/128 X |
| 2,849,027 | 8/1958 | Tetyak | 211/49 S |
| 3,196,229 | 7/1965 | Glass | 206/443 |
| 4,090,612 | 5/1978 | Lostutter | 211/13 |
| 4,195,732 | 4/1980 | Bell | 206/443 X |
| 4,427,191 | 1/1984 | Hess | 269/128 X |

FOREIGN PATENT DOCUMENTS

| | | | |
|---|---|---|---|
| 2010146 | 9/1971 | Fed. Rep. of Germany | 211/183 |
| 502587 | 11/1954 | Italy | 269/126 |
| 2059905 | 4/1981 | United Kingdom | 206/443 |
| 0727522 | 4/1980 | U.S.S.R. | 206/443 |

*Primary Examiner*—Robert W. Gibson, Jr.
*Attorney, Agent, or Firm*—Allegretti, Newitt, Witcoff & McAndrews, Ltd.

[57] ABSTRACT

The invention relates to a frame for the transport and storage of pipes of profile frame parts, of which the upper and lower profile frame parts are connectable with one another by rods which can be conducted through recesses of the profile frame parts and are swingably arranged with an end provided with a transverse piece in lateral transverse bores of a profile frame part. In order to improve the support of the pipes on the frame parts and to simplify and cheapen the manufacture, the frame parts are C-profiles with retracted base part, two C-profiles arranged in one another in opposite directions, the shanks of the outer C-profile extending beyond the base of the inner C-profile, or box profiles with side wall extensions. In particular, as middle frame parts there are used double C-profiles. In the free shanks or extensions of the profiles there are formed, as supports for the tube, divided-circular recesses, which, if need be, have a flange with inner reinforcing walls which faces inward or outward. Connecting rods join the upper and lower profiles; for this purpose recesses are provided on both ends in horizontal wall parts of the profiles.

33 Claims, 15 Drawing Figures

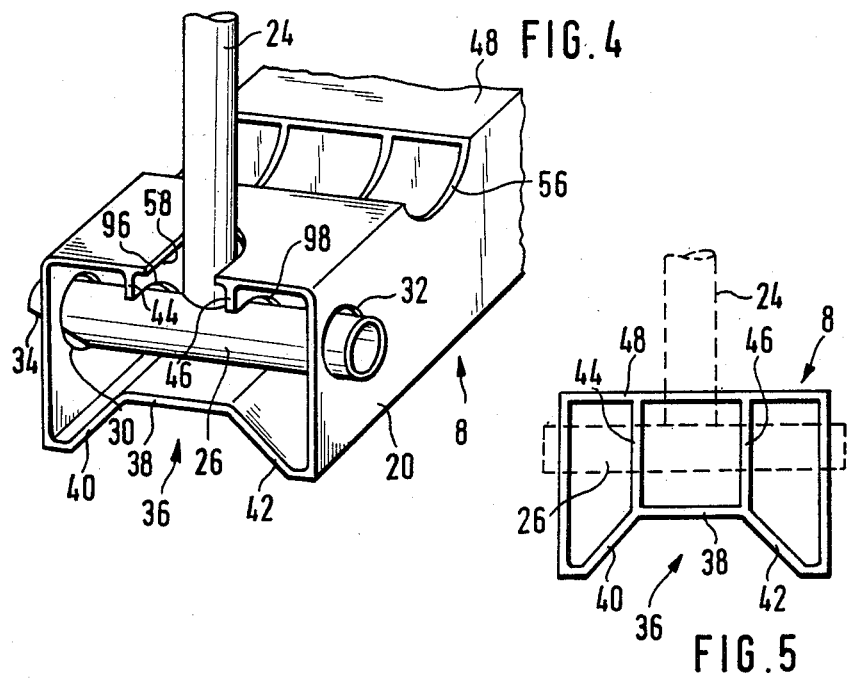
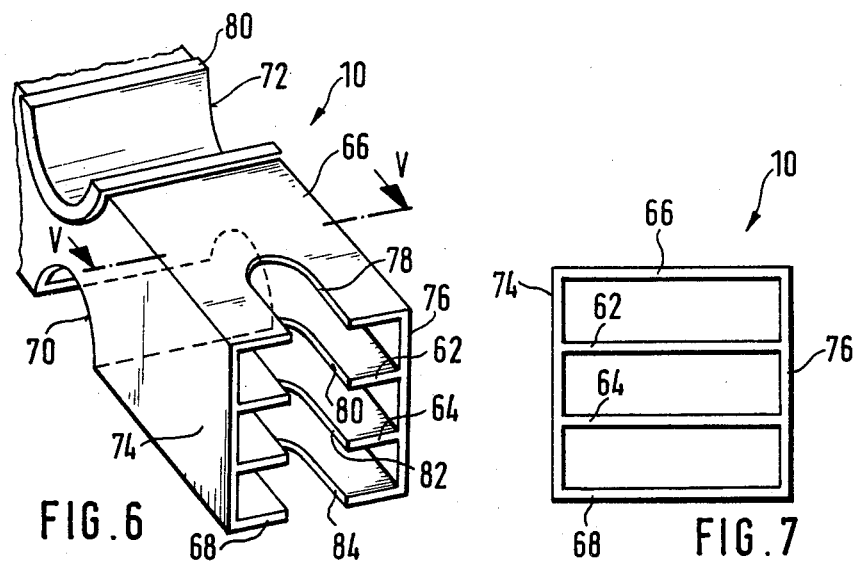

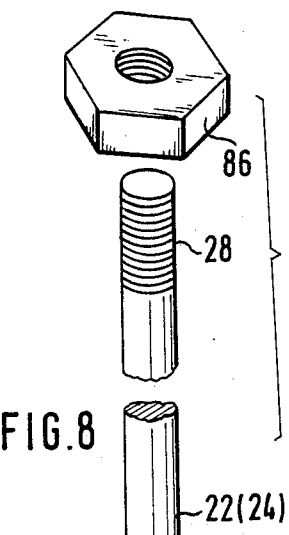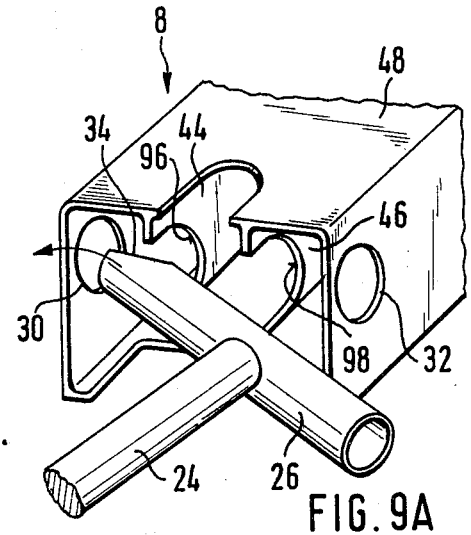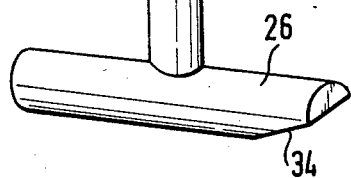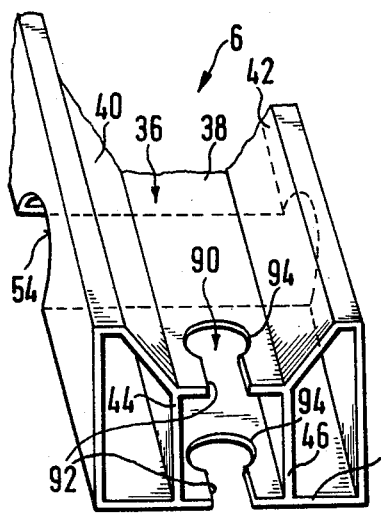

FRAME FOR THE TRANSPORT AND STORAGE OF PIPES

BACKGROUND AND SUMMARY OF THE INVENTION

The invention relates to a frame for the transport and storage of pipes.

In a publication of Sigma-Chemie Inc., Houston, Texas, there are disclosed two frames for pipes which have upper and lower, as well as middle, frame parts provided with recesses for pipes. In one frame, relatively thin steel profiles are used which are provided with steel/rubber cushions for the pipes and which are held together with the aid of several screw bolts which have to be put through between cushions. As a relatively large number of screw bolts are necessary, the assembly of the frame is very time-consuming; also, the profiles used are not sufficiently stable. In the other frame, profiled frame parts are used which are laterally equipped with plug connections and which are held together with the aid of a steel or plastic tape conducted around the frame parts and the pipe bundle. Here, too, the assembly is complicated, because the frame parts have to be put together and then the band laid around the whole frame and clamped together. The strength is not great, therefore, there is present the danger that, in case of relatively high stress in transport and in loading, the band will break.

The present invention solves this problem by, providing a frame which is assembled simply and rapidly and exhibits increased stability of the frame parts as well as of the whole frame. Furthermore, the support for the pipe is improved and the production of the frame parts is made to be simple and economical.

It is an object of the present invention to provide a frame for the transport and storage of pipes in which parts of the connecting elements of the frame can be protectively housed.

Another object of the present invention is to provide a frame for the transport and storage of pipes in which the stability of the hollow frame parts is significantly increased.

It is a further object of the present invention to provide a frame for the transport and storage of pipes in which the parts of the bolting rod connecting the upper and lower frame parts are arranged in a depression so that they have better accessibility.

In order to connect the upper frame part with the lower frame part over the bolting rod, in the upper frame part there are laterally provided bores or recesses. The use of a bore has the advantage that the bolting rod cannot slip out laterally. To be sure, the upper frame parts must be slipped onto the bolting rods. A simpler handling is yielded with the providing of recesses; here, to be sure, there is present the danger that with extreme loads the bolting rods will slip sideways out of the upper frame parts. In order to avoid this disadvantage, the frame of the present invention has a recess in the form of a keyhole which is adapted to receive a round-spigot nut.

These and other objects, advantages and features of the invention will be set forth in the detailed description which follows:

BRIEF DESCRIPTION OF THE DRAWING

FIG. 4 is a perspective representation of a lower frame part according to the present invention;

FIG. 5 is a section A—A through the frame part according to FIG. 4;

FIG. 6 is a perspective representation of a middle frame part according to the present invention;

FIG. 7 is a section A—A through the frame part according to FIG. 6;

FIG. 8 is a perspective view of the bolting rod with nut used in the frame according to the present invention;

FIGS. 9a, b detail the manner in which the bolting rod with a crosspiece is introduced in the lower frame parts according to the present invention;

FIG. 10 is a perspective view of an alternative form of the upper frame part;

In FIGS. 1–10 and 11–14 like components are provided with the same reference symbols.

DETAILED DESCRIPTION OF THE PREFERRED EMBODIMENT

Figure 1:
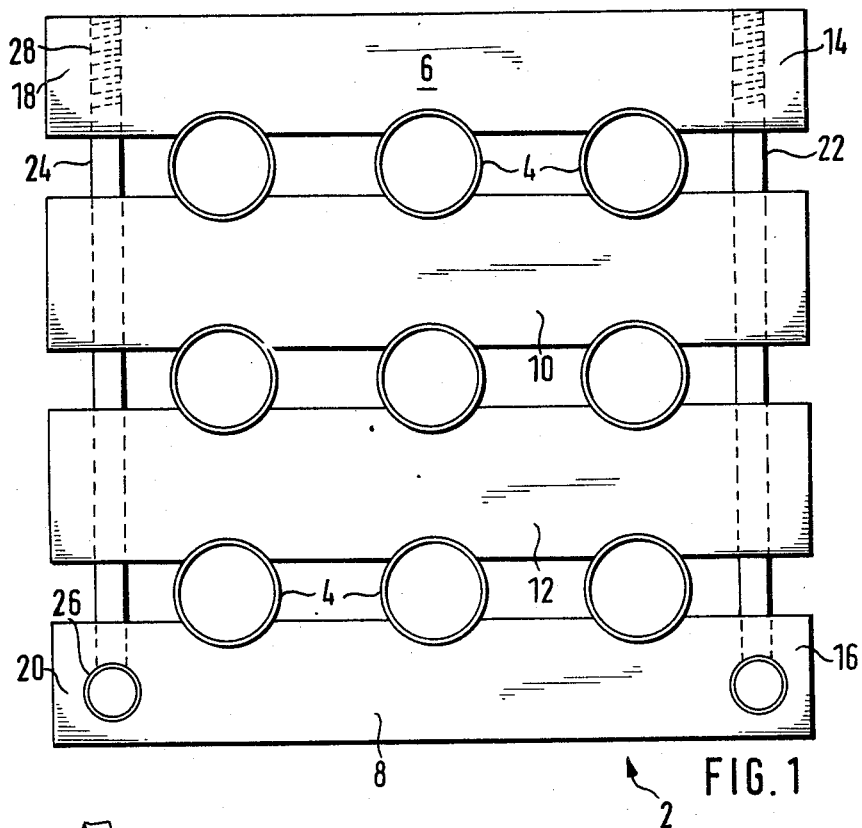
FIG. 1 is schematic view of a section through a pipe bundle held together with the frame according to the present invention.

With reference to FIG. 1, a frame 2 is shown in an assembled state, in which there are designated nine pipes 4 that are held together by the frame 2. The frame 2 consists of an upper and a lower frame part 6, 8, as well as one or more frame parts 10, 12 arranged in between. The frame parts 6, 8 are held together on their ends 14, 16, 18, 20 standing beyond the pipe bundle with the aid in each case of a bolting rod 22, 24. Each bolting rod 22, 24 has on one end a crosspiece 26 and on the other end a thread 28.

The bolting rod 22 is arranged turnably with the crosspiece 26 in the lower frame part 8. The crosspiece 26 is installable in bores 30 and 32 of the lower frame part 8 and is removable again from the bores 30, 32, for which purpose the crosspiece 26 has preferably on one end a bevel 34, which is disposed on the side lying opposite the thread part 28 of the bolting rod 22.

The upper and lower frame parts 6 and 8 are hollow profiles, preferably made of aluminum or plastic, in the form of a box with a channel-type, longitudinally running depression 36 on one side. The depression 36 has in cross section the form of an outward-opening trapeze with a bottom surface 38 and two lateral oblique surfaces 40 and 42. The bottom surface 38 is joined, with the aid of two longitudinally running reinforcing ribs 44 and 46, with the oppositely lying wall 48 of the frame parts 6 and 8. These reinforcing ribs 44, 46 connect a wall 48 with edges 50 and 52 formed by the bottom surface 38 and the oblique surfaces 40 and 42 as in FIGS. 2-5.

The upper and lower frame parts 6, 8 are provided on the wall 48 lying opposite the depression 36 with several spaced divided-circular recesses 54, 56 for the pipes 4, the radius of curvature of which is selected to correspond to the radius of the pipes to be received in each case.

The lower frame parts 8 have at their ends the transverse bores 30, 32 for the crosspiece 26 of the bolting rod 22 or 24. So that the bolting rod 22 or 24 along with crosspiece 26 are introducible into the bores 30, 32 and disposable into a vertical installation position for connection with the upper frame part 6, the wall 48 has two lateral recesses 58. The reinforcing ribs 44, 46 are removed to the depth of the recesses 58 and also have therein recesses 96, 98, the width of which approximately correspond to the diameter of the crosspiece 26.

Figure 2:
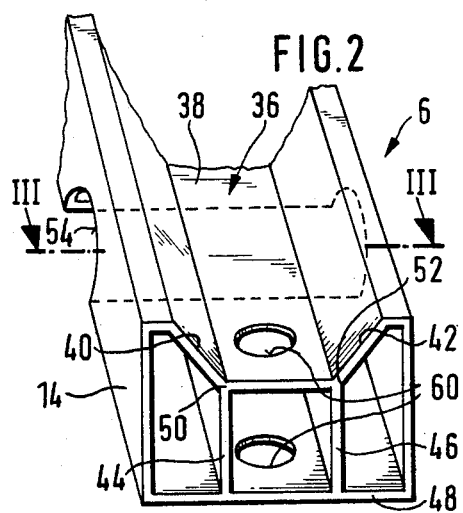
FIG. 2 is a perspective representation of an upper frame part according to the present invention.
Figure 3:
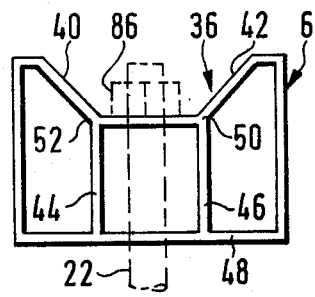
FIG. 3 is a section A—A through the frame part according to FIG 2.

In the upper frame part 6, as in FIGS. 2 and 3, there is formed laterally in each case a vertical bore 60, the inside diameter of which is less than the width of the bottom surface 38 of the depression 36 and less than the distance between the reinforcing ribs 44, 46. In the upper frame part 6, there can be provided, instead of the bores 60, lateral recesses 90, 92 and 94, as in FIG. 10, in the wall 48 and the bottom surface 38. As in the lower frame 8, the width of the recesses is likewise less than the width of the bottom surface 38 and less than the distance between the reinforcing ribs 44 and 46.

The middle frame parts 10, 12, as in FIGS. 1, 6 and 7, are made as box-shaped hollow profiles of aluminum or plastic with inside transversely and longitudinally running reinforcing walls 62, 64.

In the outer walls 66, 68, parallel to the reinforcing walls 62, 64, there are formed circular openings 70, 72 lying opposite one another for the pipes 4. The radius of curvature of the openings 70, 72 corresponds to the radius of the pipes to be received and the maximum depth of which is less than the distance between the outer walls 66, 68 and in each case the reinforcing walls 62, 64 adjacent to the walls 66, 68.

The middle frame parts 10, 12 can also be turned through 90°. The recesses are then formed in the walls 74 and 76 perpendicular to the walls 66, 62, 64 and 68.

The middle frame parts 10, 12 also have lateral recesses 78, 80, 82, 84 in the walls 66, 62, 64 and 68, which are aligned with one another and the depth of which corresponds to the depth of the recesses 58 in the lower frame part 8 and the width of which corresponds to greater than or equal to the thickness of the bolting rods 22, 24. The recesses 78, 80, 82, 84 are, when the middle frame parts 10, 12 are turned through 90°, provided centrally in the walls 74 and 76, the width of the recesses being less than the distance between the walls 62 and 64.

The length of the middle frame parts 10 and 12 can also be chosen in such a way that these end in front of the bolting rods 22 and 24. In this case, the lateral recesses can be omitted.

For the protection of the pipes 4, there can additionally be laid in the circular recesses 54, 56, 70, 72 of the frame parts 6, 8, 10, 12, shells 80 of plastic, preferably with lateral wind-offs, as is represented in FIG. 6.

When a pipe bundle has been stacked in the desired size, as in FIGS. 1 and 8, the bolting rods 22 and 24 with the crosspiece 26 are inserted in the transverse bores 30, 32 of the lower frame parts 8 and swung upward—either into the recesses 78, 80, 82, 84 of the middle frame parts 10, 12 or to before their ends. Then the upper frame parts 6 are slipped onto the ends of the bolting rods 22 and 24 provided with the thread. With the aid of nuts 86 screwed onto the thread part of the bolting rods 22 and 24, the upper and lower frame parts 6 and 8 are then tightened against one another.

If the upper frame parts 6 are provided with lateral recesses, then the bolting rods 22 and 24 are simply swung into these recesses, after which the frames 6, with the aid of the nuts 86 which are screwed onto the thread parts of the bolting rods 22 and 24 are tensioned. The nuts 86 lie protected in the channel-type depression 36, cf. FIGS. 3 and 10.

With reference to FIG. 9, there is represented the manner of installation of the bolting rod 24 into the lateral bores 30 and 32 of the lower frame part 8. It is clearly perceived how by providing the bevel 34, the installation and, correspondingly, also the removal of the bolting rod 24 is facilitated. The bevel 34 is formed on the side of the crosspiece 26 lying opposite the bolting rods 22, 24.

Figure 11:
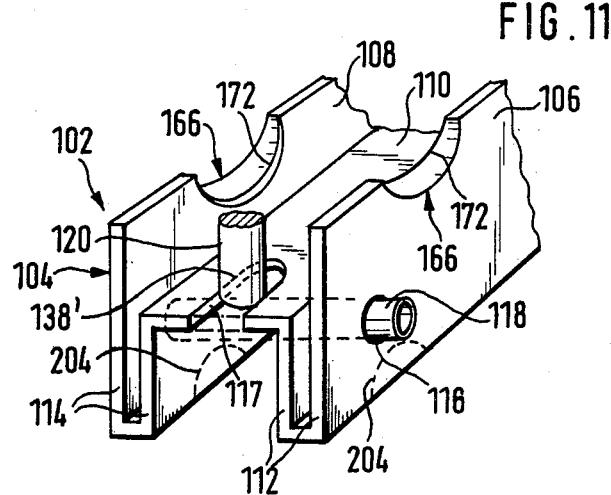
FIG. 11 is a perspective representation of a frame part formed according to the present invention, suited for use as an upper, lower and middle frame part.

With reference to FIG. 11, a frame part 102 is shown which is usable as an upper or lower frame part. In FIG. 11, it is formed for use as lower frame part. Frame part 102 is comprised of a C-profile 104 with free shanks 106 and 108. The base part 110 of C-profile 104 is formed strongly retracted, so that there are formed downward-facing double walls 112 and 114. The walls 112, 114 have, on both ends, a transverse bore 116. The retracted base part 110 has an outward open recess 117 for the reception of a crosspiece 118 of a connecting rod 120 as well as for the connecting rod itself, with which the lower frame part 102 can be connected with the upper frame part. The connecting rod 120 is turnably seated with the crosspiece 118 in the transverse bore 116.

Figure 12:
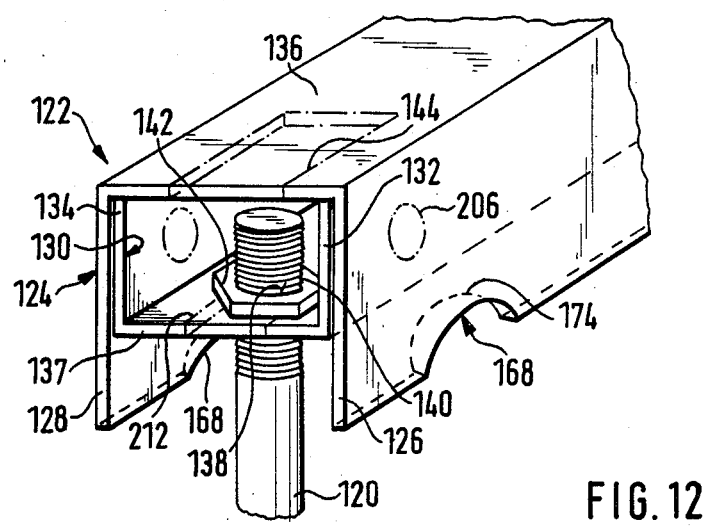
FIG. 12 is a perspective representation of an alternative frame part constructed according to the present invention, suited for use as an upper or lower frame part.

An alternative form of a frame part 122 is represented in FIG. 12, which likewise is usable as an upper or lower frame part. In FIG. 12, it is constructed for use as an upper frame part. Frame part 122 is comprised of a first, outer, larger C-profile 124 with downward-pointing free shanks 126, 128 and a second, inner, smaller C-profile 130 solidly joined, by welding for example, with the C-profile 124, with upward-pointing free shanks 132, 134. The shanks 132, 134 preferably lie on the base 136 of the C-profile 124. In the base 137, of the inner C-profile 130, there are formed on both ends holes or bores 138 for the reception of the upper part provided with a thread 140 of the connecting rod 120, onto which there can be screwed a nut 142. For easier handling of the nuts 142, there can be formed in the base 136 of the C-profile 124 a recess 144 (indicated in broken lines).

Figure 13:
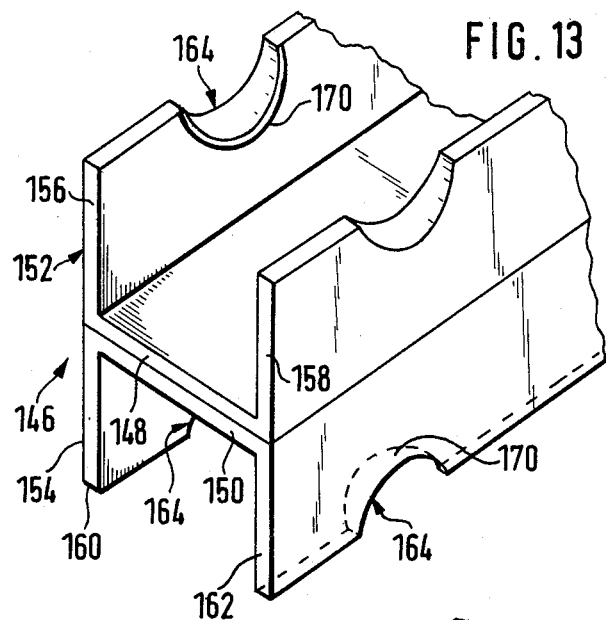
FIG. 13 is a perspective representation of a middle frame part.

A middle frame part is presented in FIG. 13. It consists of two C-profiles 152, 154 solidly joined with their base parts 148, 150 (for example by welding), so that there are formed upward- and downward-facing free shanks 156, 158 and 160, 162.

Figure 14:
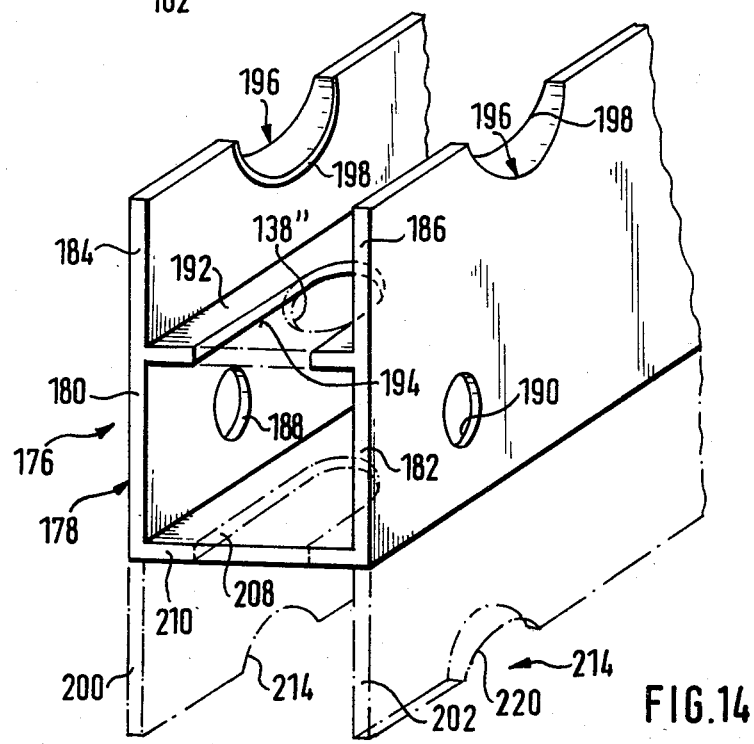
FIG. 14 is a perspective representation of an alternative frame part constructed according to the present invention, suited for use as a lower, upper or middle frame part.

An alternative form of a frame part 176 according to the present invention is represented in FIG. 14, which likewise can be used as upper or lower frame part. In FIG. 14, it is formed for use as a lower frame part. Frame part 176 is comprised of a box profile 178, the wide walls 180, 182 of which present upward-facing extensions 184, 186. The box profile 178 has disposed on both ends lateral transverse bores 188, 190, as well as in the upper box wall 192 a recess 194 for the reception of the connecting rod 120.

In the free shanks 156, 158 and 160, 162 of the middle frame parts 146 as in FIG. 13, as well as in the upward-pointing free shanks 106 and 108 of the C-profiles 104, as in FIG. 11, in the upward-point extension 184, 186 of the box profiles 176, as in FIG. 14 and the downward-pointing free shanks 126 and 128 of the C-profiles 124 as in FIG. 12, there are formed, in predetermined intervals, divided-circular recesses 164, 166, 196, 168 as supports for pipes to be stored and to be transported (not represented). The recesses have inward-directed flanges 170, 172, 198, 174 for the widening of the supports. The recesses and flanges are formed in one operation by bending along a divided-circle line.

As material for the frame parts 102, 122, 146, 176 all shapable materials are suited, especially steel plates.

The profiles 14 according to FIG. 11 are usable directly also as middle frame parts. In this case, there must additionally be formed in the double walls 112 and 114, recesses 204 (indicated in broken lines).

Obviously, as well, the profile 176 is usable as a middle frame part if the box profile 178 also has on the lower side, extensions 200, 202 (indicated in broken lines) with corresponding recesses (indicated in broken lines) as supports for the pipes to be stored or transported and additional recesses on both ends in the side 210 lying opposite side 192 for the bolting rod 120, cf. FIG. 14.

The profiles 146, 102, 172 used as middle frame parts can be made shorter than the upper and lower frame parts, in such a way that the connecting rods 120 in the assembled state are arranged in front of the middle frame parts and it is possible to dispense with the recesses on both ends, cf. FIG. 13, for the profile 146.

In the case of use of the profile 22 a lower frame part, in the zone of the free shanks 132, 134 of the inner C-profile 130 there are to be provided transverse bores 106 and the bore 138 is to be enlarged into an outward open recess 212.

If the profile 104 is used as upper frame part, the transverse bores 116 on both ends are absent and instead of the recesses 117 there can be used bores 138' (indicated in broken lines), through which the connecting rods 120 can be slipped.

If the profile 176 is used as upper frame part, the transverse bores 188, 190 on both ends are absent and instead of the recesses 194 there can also be used bores 138'' (indicated in broken lines) through which the connecting rods 120 are inserted.

The flanges 220 of the recesses may also point outward, as is indicated by way of example in the drawing of FIG. 14.

It should be understood that the foregoing disclosure emphasizes certain specific embodiments of the invention and that all modifications or alternatives equivalent thereto are within the spirit or scope of the invention as set forth in the appended claims.

What is claimed is:

1. Frame for the transport and storage of pipes having several profiled frame parts arranged one over another, and having upper and lower frame parts connectable with one another and middle frame parts, said upper and lower frame parts being connectable with one another by at least one bolting rod means, said bolting rod means being insertable into one of said frame parts and swingably borne therein, the improvement comprising, said upper and lower frame parts having an outer side and an outer wall, said outer side having a channel-type depression therein extending along a generally horizontal axis defined by said outer side, and said depression having a bottom surface and side walls, said bottom surface being joined by reinforcing walls with said outer wall of said frame part.

2. Frame according to claim 1, wherein said depression has in cross section the form of an outwardly widening channel and a depth greater than the height of nuts screwable onto said bolting rod means.

3. Frame according to claim 1, wherein said bottom surface has edges formed thereon, said edges being connected by said side reinforcing walls, said reinforcing walls connecting said walls of said depression with said outer wall.

4. Frame according to claim 1, wherein said upper frame parts have laterally disposed thereon a vertical bore of a recess for receiving said bolting rod means.

5. Frame according to claim 4, wherein said recess has the form of a keyhole, said recess having a narrow part open to the end of said frame part and a round part, said narrow part having a width corresponding to the diameter of said bolting rod means, said round part having a diameter which is greater than the width of said narrow part.

6. Frame according to claim 4, wherein said bore of said recess is conducted between said reinforcing walls.

7. Frame according to claim 1 wherein said lower frame parts have laterally disposed thereon a transverse bore for detachably receiving a crosspiece of said bolting rod means.

8. Frame according to claim 7, wherein said reinforcing walls have laterally disposed therein a recess, said transverse bores being arranged in the lateral outer walls of said lower frame parts.

9. Frame according to claim 7, wherein said crosspiece has at least on one end a bevel.

10. Frame according to claim 9, wherein said bolting rod means has on one end said crosspiece and on the other end a thread for a nut.

11. Frame according to claim 1, wherein said middle frame parts have opposite outer walls and at least one middle reinforcing wall.

12. Frame according to claim 11, wherein said middle frame parts have laterally disposed therein recesses which in the installation position are aligned with the bores or recesses in said upper and lower frame parts and into which said bolting rods means are swingable.

13. Frame according to claim 11, wherein said middle frame parts have a length, said length being less than the distance between said bolting rods means, said bolting rod means running on both sides of a pipe bundle, said pipe bundle being comprised of pipes, said pipes having a radius.

14. Frame according to claim 13, wherein said upper frame parts have disposed thereon circular recesses for receiving of said pipes on the underside, said lower frame parts have disposed thereon circular recesses for receiving of said pipes on the upper side, and said middle frame parts have disposed thereon circular recesses for receiving of said pipes on the upper and the lower side.

15. Frame according to claim 14, wherein said recesses have radii of curvature, said radii being aligned with one another in an installation position and corresponding to said radius of said pipes.

16. Frame according to claim 14 or 15, wherein said recesses in said middle frame parts have a depth, said depth being less than the distance between outer walls and are disposed adjacent said middle reinforcing walls.

17. Frame according to claim 10, wherein said channel-type depressions have a depth greater than the height of said nuts screwable onto said bolting rod.

18. Frame according to claim 16, wherein said recesses are adapted to receive protective shells formed complementarily thereto with or without lateral bends.

19. Frame according to claim 10, wherein said bevel is formed on the side of said bolting rod away from said thread part.

20. Frame for the transport and storage of pipes with several profile frame parts arranged one upon another, and having upper, middle and lower profile frame parts, said upper and lower frame parts being connectable with one another by rods that are connectable through recesses of the profile frame parts and are swingably arranged with an end provided with a crosspiece in lateral transverse bores of a profile frame part, wherein said upper and lower frame parts are in the form of C-profiles having a retracted base part, said middle frame parts are in the form of double C or H-profiles, said C-profiles and double C or H-profiles having free shanks, said free shanks having therein divided-circular recesses formed as supports for said pipes, said recesses having a flange mounted thereon substantially aligned with the curvature of said recesses.

21. Frame for the transport and storage of pipes with several profile frame parts arranged one upon another, and having upper, middle and lower profile frame parts, said upper and lower frame parts being connectable by rods that are conductable through recesses of the profile frame parts and are swingably arranged with an end provided with a crosspiece in lateral transverse bores of a profile frame part, wherein said upper and lower frame parts have a first, outer C-profile in which there is arranged a second, inner C-profile that is firmly joined with the first C-profile, said second, inner C-profile having free shanks which point to the base part of said first C-profile and are shorter than the free shanks of said first C-profile, said free shanks of said first C-profile extending beyond the base part of said second, inner lying C-profile, said middle frame parts are double C or H-profiles having free shanks, said free shanks of said upper, middle and lower frame parts having formed therein divided-circular recesses serving as supports for said pipes, said recesses having a flange mounted thereon substantially aligned with the curvature of said recesses.

22. Frame for the transport and storage of pipes with several profile frame parts arranged one upon another, and having upper, middle and lower profile frame parts, said upper and lower frame parts being connectable with one another by rods that are conductable through recesses of the profile frame parts and are swingably arranged with an end provided with a crosspiece in lateral transverse bores in a profile frame part, wherein said upper and lower frame parts are in the form of box profiles having two opposite side walls, said side walls having extensions directed in the same direction, said middle frame parts are double C or H-profiles, said box profiles and double C or H-profiles having free shanks, said free shanks and extensions having formed therein divided-circular recesses serving as supports for said pipes, said recesses having a flange mounted thereon substantially aligned with the curvature of said recesses.

23. Frame according to claim 20 wherein said recesses inclusive of said flanges are formed by reshaping about a divided-circular line in said shanks and extensions of said profiles.

24. Frame according to claim 20 wherein said upper and lower frame parts have on the two ends of said retracted base part a bore or a recess open toward the end for reception of said connecting rod.

25. Frame according to claims 21 or 22, wherein said outer C-profile has in said base part and said box profile has in the side lying opposite the box profile side a recess open toward the end.

26. Frame according to claim 20, wherein said shanks of said C-profile having said retracted base part overhang said base part, by at least the greater of the depth of the recesses and of the supports for said pipes.

27. Frame according to claim 1, wherein said frame parts are constructed of aluminum or plastic.

28. Frame according to claim 21, wherein said recesses inclusive of said flanges are formed by reshaping about a divided-circular line in said shanks and extensions of said profiles.

29. Frame according to claim 22, wherein said recesses inclusive of said flanges are formed by reshaping about a divided-circular line in said shanks and extensions of said profiles.

30. Frame according to claim 21, wherein said upper and lower frame parts have on the two ends of said base part of said second, inner-lying C-profile of said frame part a bore or a recess open toward the end for reception of said connecting rod.

31. Frame according to claim 22, wherein said upper and lower frame parts have on both ends of said box profile lying between said extensions a bore or a recess open toward the end for reception of said connecting rod.

32. Frame according to claim 21, wherein said shanks of said first outer C-profile overhang said base part of said second, inner-lying C-profile by at least the greater of the depth of the recesses and of the supports for said pipes.

33. Frame according to claim 22, wherein said extensions of said box profile overhang said adjacent transverse walls and said free shanks of said double C or H-profiles overhang said strap part by at least the greater of the depth of the recesses and of the supports for said pipes.

* * * * *